Feb. 23, 1960 G. N. ROMINE 2,925,929
DIE HANDLER
Filed Dec. 30, 1955 5 Sheets-Sheet 1

INVENTOR.
GLENN N. ROMINE
BY
Eugene C. Knoblock
ATTORNEY

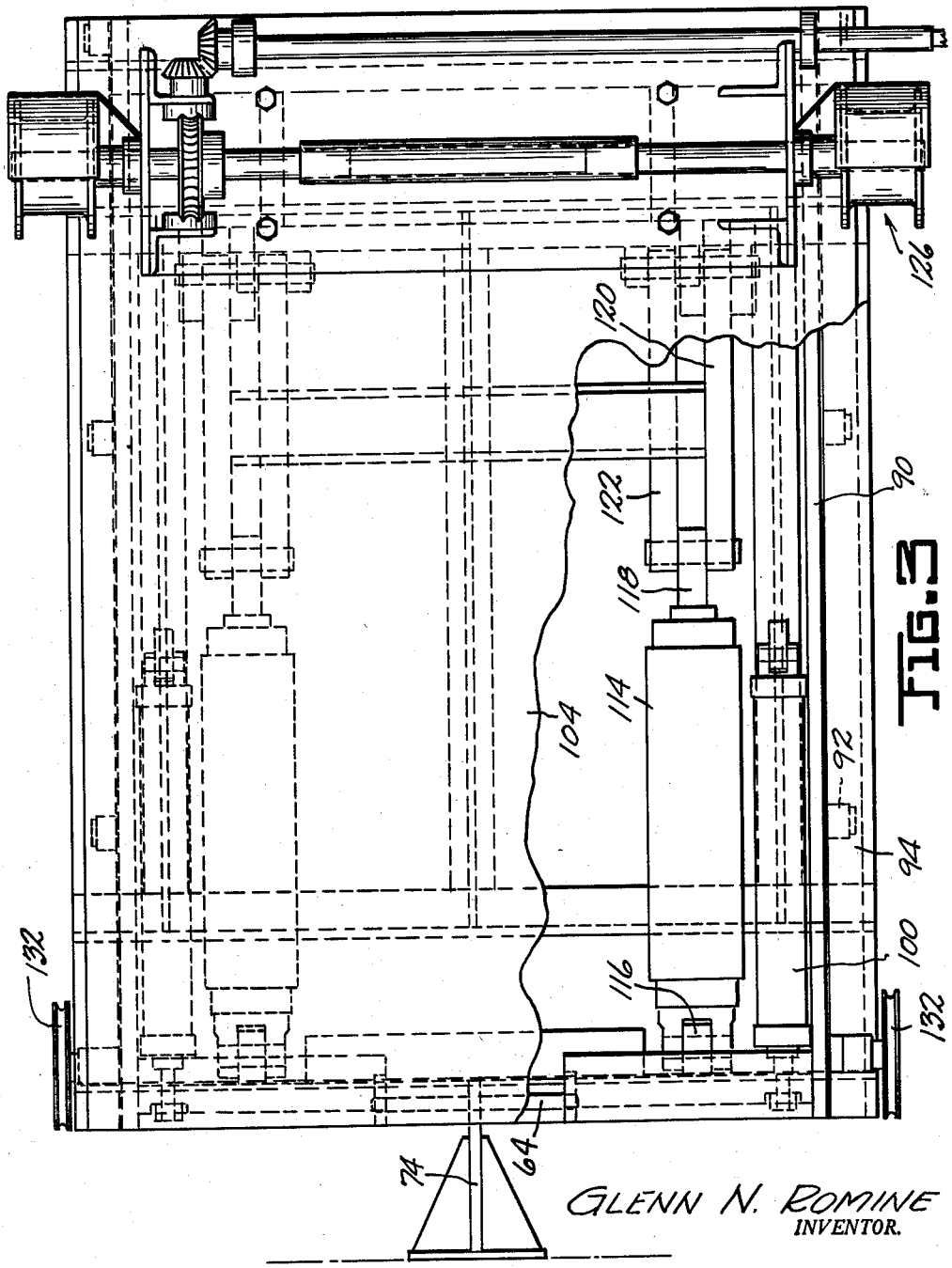

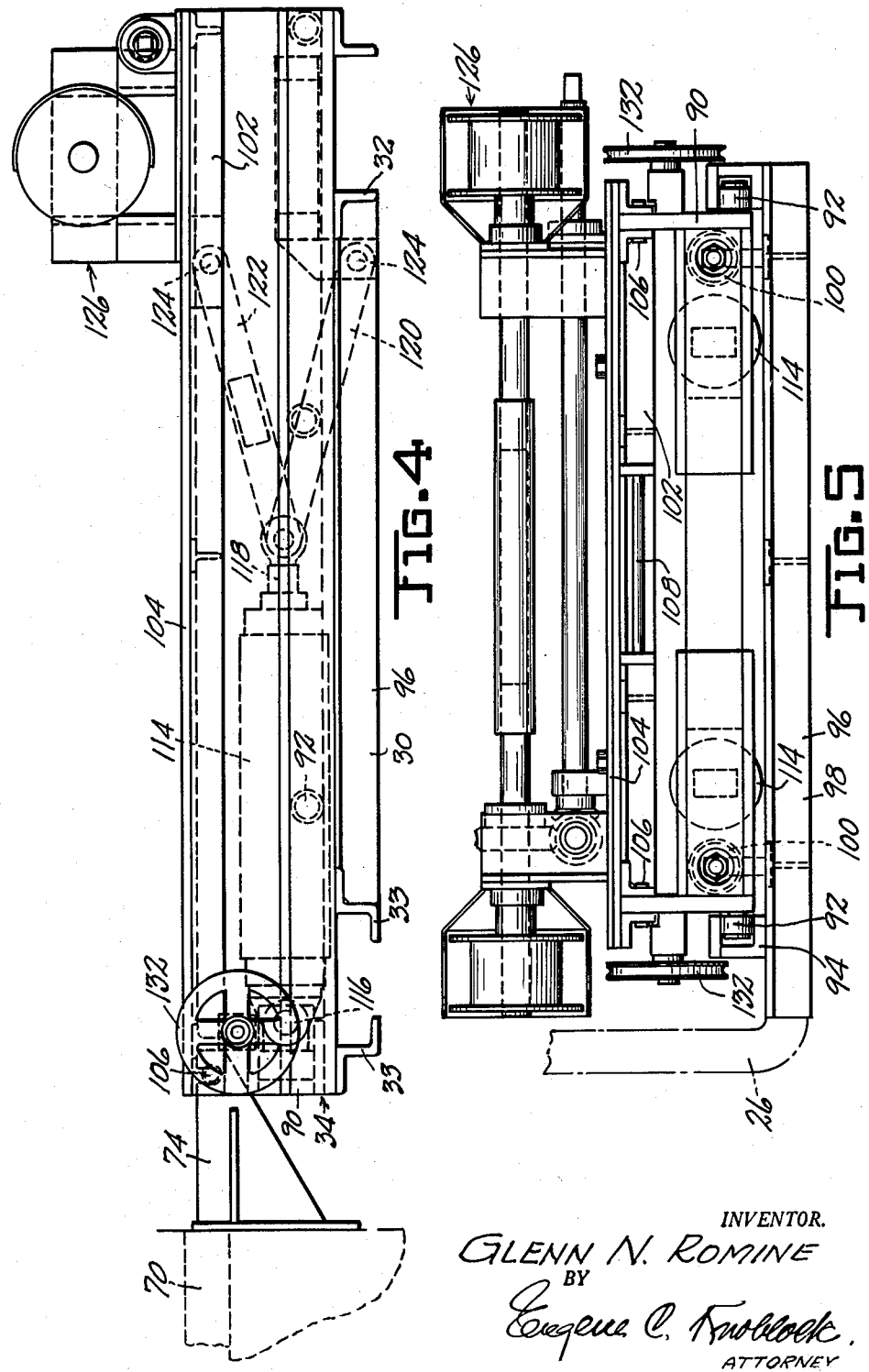

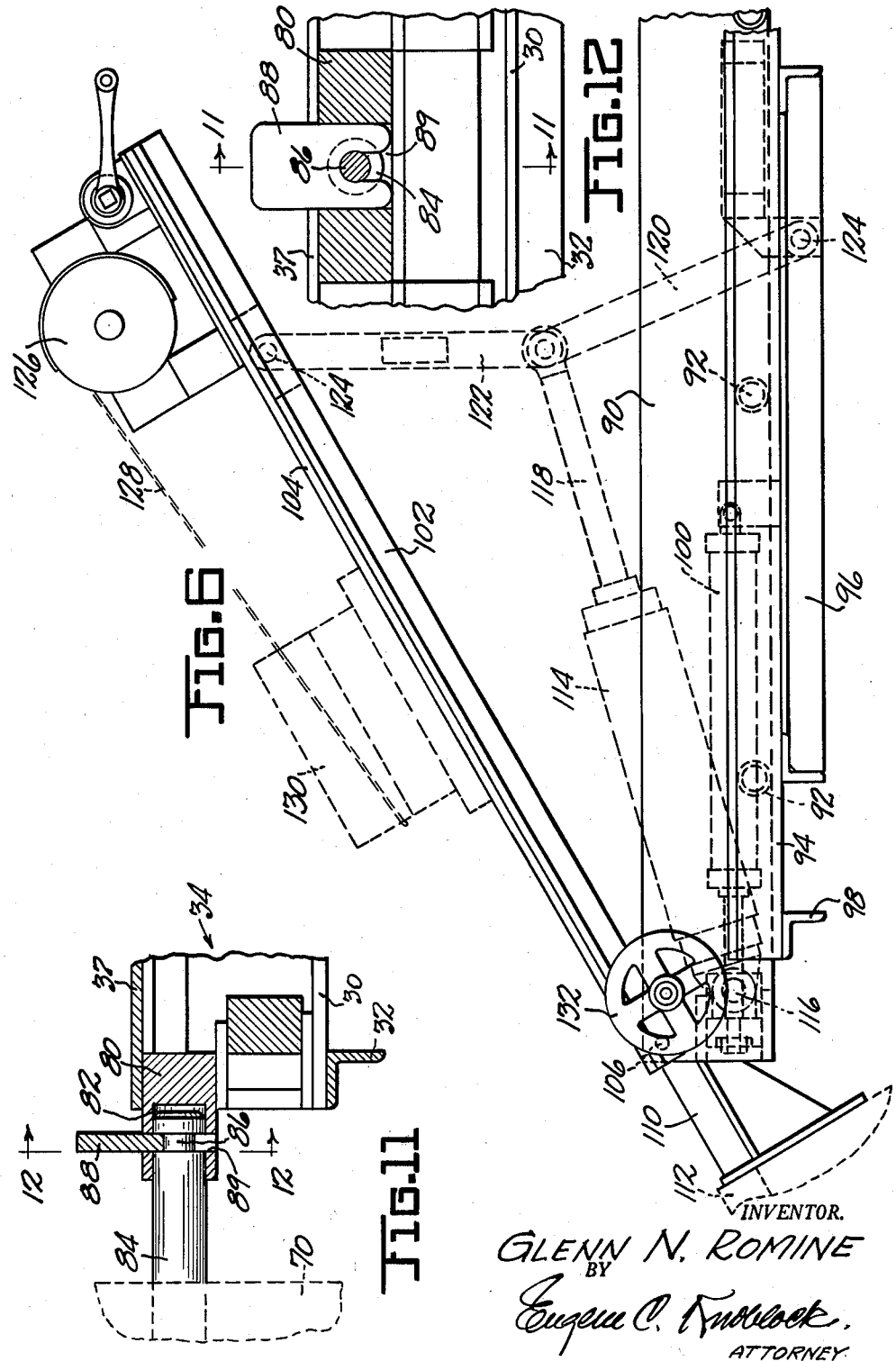

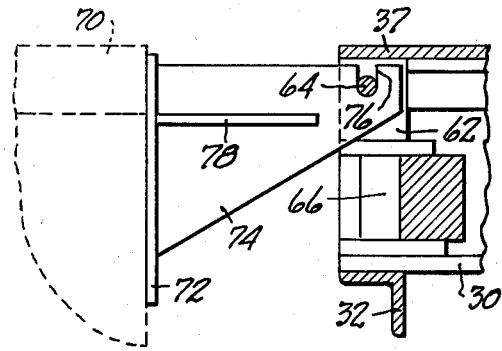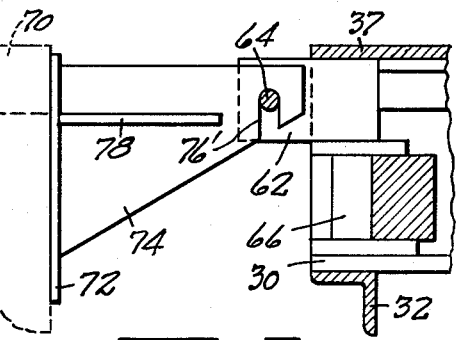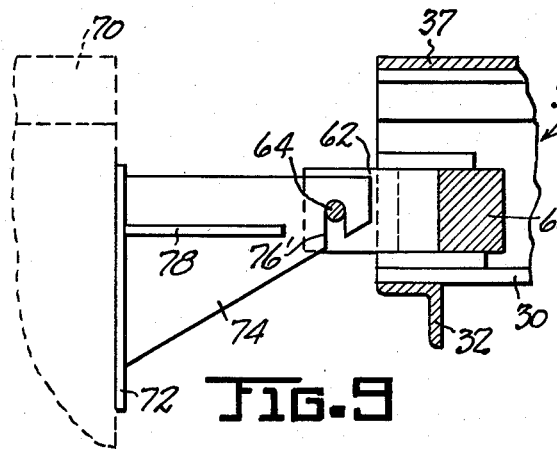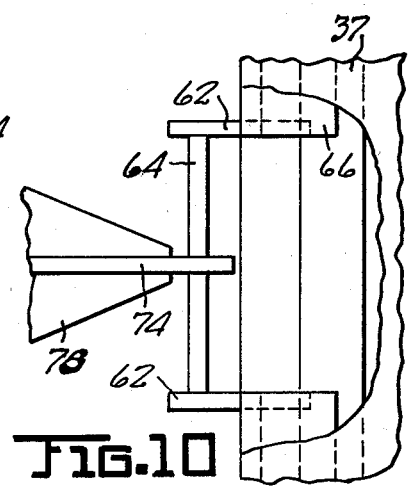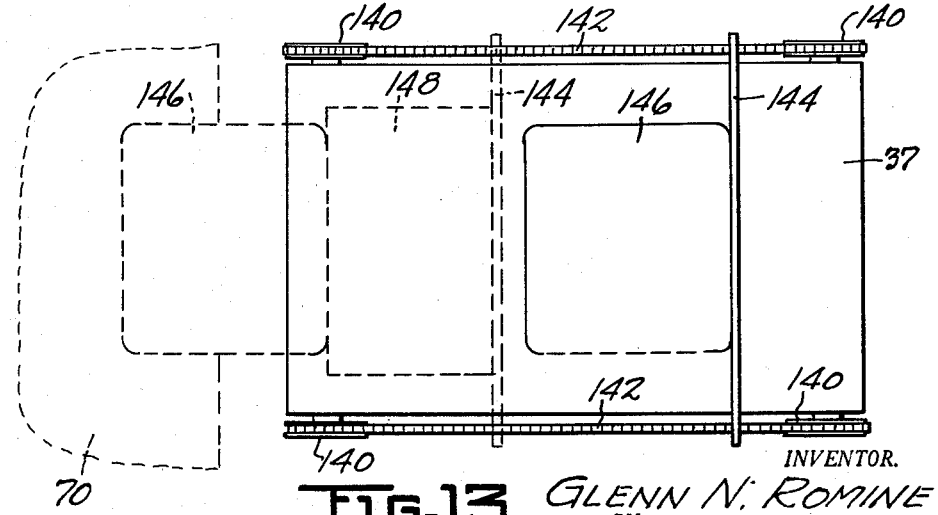

United States Patent Office 2,925,929
Patented Feb. 23, 1960

2,925,929
DIE HANDLER

Glenn N. Romine, Fort Wayne, Ind., assignor to Rack Specialists, Inc., South Bend, Ind., a corporation of Indiana Application December 30, 1955, Serial No. 556,701

15 Claims. (Cl. 214—514)

This invention relates to improvements in work transfer devices. More particularly, it relates to a device adapted to be mounted upon a fork lift truck for use in transferring metal-working dies, plastic molds and other unit loads from one location to another, for example, for shifting dies from a storage rack to a press or other machine in which they are installed for use.

Some unit loads, such as metal-working dies and plastic molds, are very heavy and also are very costly, so they must be handled carefully to insure against injury or damage thereto. The weight of the item makes handling thereof difficult, and the care with which it must be handled is time-consuming. Thus a great deal of trouble and expense is now experienced in industry in changing over a plastic molding machine or a metal-working press from use with one mold or die to another mold or die. This is generally called set-up time and is nonproductive, so that any saving of time required for setting up an operation results in a reduction of the cost of the part manufactured.

Various types of work transfer devices have been produced heretofore, and in many instances have been manually operable and manually propelled, or, where power operated, have entailed great cost for the limited service performed, and have been idle for long periods of time between uses. Such items are advantageous from the standpoint that they have means for controlling the elevation at which a unit load is positioned to readily accommodate its transfer between the point of storage at one elevation and a point of use at a different elevation, and from the standpoint of other services they perform. Such devices are also advantageous in that they are usually wheeled units and hence facilitate movement from place to place of the device with the load thereon, so that the operator need not lift or carry any of the weight of the unit load. Means also are commonly provided in such devices for shifting the unit load therefrom and onto a machine, a rack or the like, and for withdrawing a unit load from a machine or rack and placing it upon the machine. The manual devices have usually had limits of usefulness, however, by reason of the need to manually push the device from place to place while loaded, and have necessitated careful manual manipulation for holding the apparatus in desired position as the weight of the unit load is transferred between the apparatus and a press or support. Another disadvantage has been that prior manually operated devices usually require manually operable means for controlling the elevation thereof. Thus a great deal of manual or physical exertion is required by the user to install and remove dies and molds relative to supports, machines and the like.

It is the primary object of this invention to provide a device of this character which may be mounted detachably upon the fork lift arms of a fork lift truck of the self-propelled type to facilitate rapid movement of a unit load from one point of use or location to another location and to facilitate transfer of the unit load between the transport apparatus and a fixed support.

A further object is to provide a device of this character adapted for attachment to a fork lift truck and having means thereon adapted to releasably interlock with an anchor portion upon a seat or support so as to stabilize the fork lift attachment upon the fork lift truck and to hold the same in selected orientation relative to a stationary support during the time that a load is being transferred between the same and such support.

A further object is to provide a device of this character comprising a unitary attachment for a fork lift truck, having means adapted to be anchored to the fork arms of a lift truck, a laterally shiftable platform upon which a heavy load may be slid for removal of the load therefrom and for delivery of a load thereto, and an anchoring mechanism for holding the platform in selected horizontal or lateral orientation relative to a part or support to or from which transfer of a load is to be effected.

A further object is to provide a device of this character adapted to be mounted upon a fork lift truck and including a tiltable portion and means for tilting the same by power, together with means for sliding a load on the tiltable platform, whether tilted or horizontal, wherein said tiltable platform has an anchor member for engaging with a fixed member with respect to which the load member is to be transferred.

Other objects will be apparent from the following specification.

In the drawing:

Fig. 3 is an enlarged top plan view with parts broken away and illustrating a modified embodiment of the invention;

Fig. 4 is a view in side elevation illustrating the construction shown in Fig. 3;

Fig. 5 is an end view of the device shown in Fig. 3;

Fig. 6 is a side view illustrating the construction of Fig. 3 in tilted position;

Fig. 7 is an enlarged detail view illustrating one type of anchorage or connection between the device and a stationary support;

Fig. 8 is a detail view illustrating another type of connection;

Fig. 9 is a detail view illustrating a third type of connection;

Fig. 10 is a top plan view of the construction shown in Fig. 9;

Fig. 11 is a detail view of another type of connection taken on line 11—11 of Fig. 12;

Fig. 12 is a detail sectional view taken on line 12—12 of Fig. 11;

Fig. 13 is a top plan view illustrating a different type of load-shifting means upon a device of this character.

Figure 1:
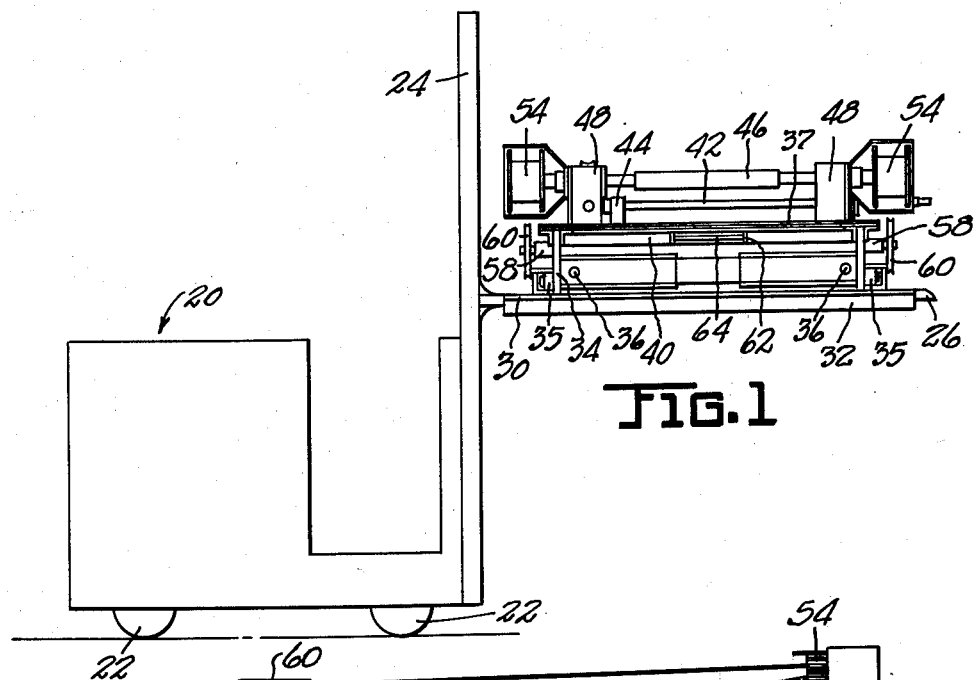
Fig. 1 is a view in side elevation illustrating the device mounted upon a fork lift truck shown schematically.

Referring to the drawings, and particularly to Fig. 1, the numeral 20 designates a self-propelled industrial truck of the type commonly known in the trade as a fork lift truck and being powered by a gasoline engine or electric batteries or any other suitable power source or prime mover. The vehicle is supported upon wheels 22 and is provided with suitable means (not shown) for steering the same and for controlling the operation thereof. The vehicle includes a mast structure 24 extending upright or substantially upright thereon and may be provided with means (not shown) for adjusting its position as between vertical and inclined adjustments. Lift mechanism (not shown) under control of the operator and actuated by power is mounted adjustably upon the mast structure 24 and includes elongated fork arms 26 extending perpendicularly forwardly from the mast structure 24 and adjustable vertically upon the mast. The fork lift truck may have other features and elements of the type well known in the art, and is adapted to be self-propelled while carrying a load upon the fork arms 26 thereof, and for this purpose will preferably be suitably counterbalanced longitudinally.

My attachment or device preferably includes a base portion 30 which may constitute a plate or fabricated rigid structure 30 having a pair of sets of fork-engaging members 32, such an angle irons, extending in parallel spaced relation therebelow to receive fork arms 26 of a truck therebetween, or Z-shaped members 33 as illustrated at the left in Fig. 4, to fit around such fork arms and with parts thereof anchoring under the fork arms of the lift truck. The device is removably mounted upon the fork arms 26 and is positioned thereon by said members 32 or 33. The members 32 or 33 preferably project below the fork lift arms when the device is resting thereon, so that the vehicle may be driven relative to the device while mounted upon a support to pass the forks thereunder between members 32 for the purpose of loading or mounting the device upon the lift truck or for disengaging the device from the truck.

The structure of the device includes a traverse frame or unit 34 supported by rollers 35 which travel upon horizontal guide portions of base 30. Suitable power units 36, such as double-acting fluid pressure cylinder-piston members, interconnect the frame 30 and traverse unit 35 to propel the latter. Units 36 are provided with means (not shown) for detachable coupling thereof to fluid pressure generating means on the truck 20. The traverse unit includes a top plate or platform 37 which is preferably smooth and flat and of sufficient strength and rigidity to support and accommodate sliding thereon of a heavy member, such as a die, mold or other unit load 38. Any suitable structure, such as bracing members 40, may be associated with the plate or platform 37 to strengthen and rigidify the same.

Figure 2:
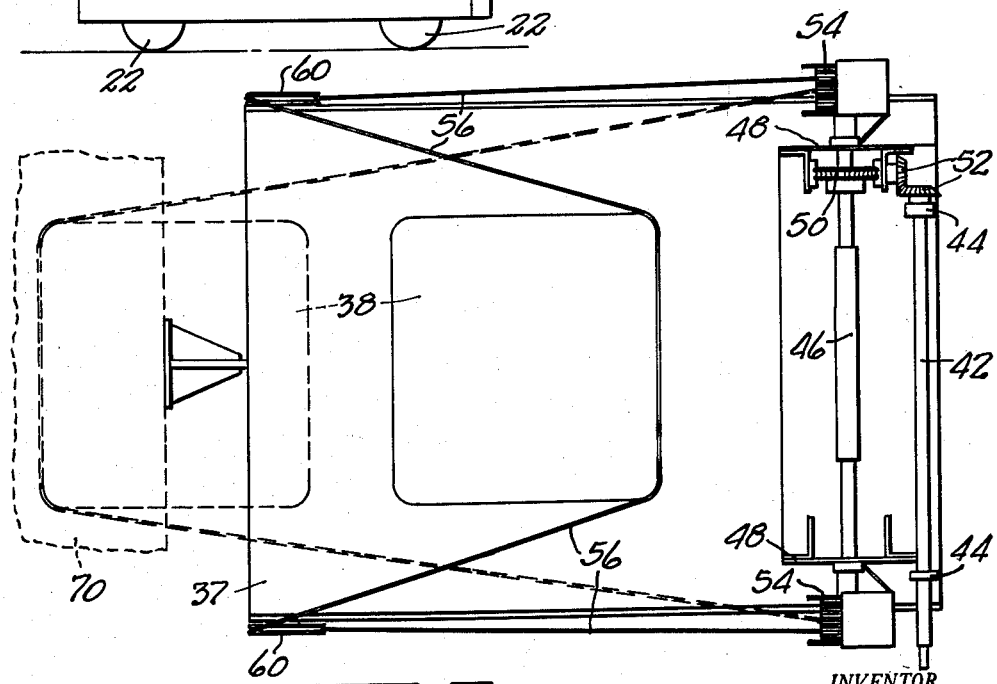
Fig. 2 is an enlarged top plan view of the device illustrating in anchored or connected relation to a support member.

Any suitable work shifter is mounted upon the traverse unit. As illustrated in Figs. 1 and 2 the work shifter constitutes a manually operable winch. It will be understood, however, that a power-activated shifter may be provided, if desired. The winch shown in Fig. 2 includes an actuating shaft 42 journaled in a suitable support 44 upon the device, as by being mounted upon the platform 37 at one side thereof and preferably extending substantially parallel to the fork-engaging members 32 and transverse of the path of travel of the traverse unit. A shaft 46 is journaled upon a suitable supporting structure 48 and mounts a worm gear 50 driven by a worm (not shown) associated with bevel gearing 52 to effect a drive connection with the shaft 42 in the manner well understood in the art. The shaft 46 mounts one or more drums or spools 54 around each of which is wound an end portion of a cable 56. Where two drums 54 are provided to mount opposite ends of a cable, studs or other supports 58 are mounted at the end of the platform 37 opposite that which mounts the winch. Studs 58 journal pulleys 60 around which the cable 56 may be trained, as seen in Fig. 2.

The device is provided with interlock means for detachably connecting the traverse unit to a support. Thus, as shown in Fig. 1, reinforcing structure 40 and the platform 37 may carry spaced structural members 62 preferably located adjacent the edge of the platform 37 and therebelow, which members are interconnected by a cross bar 64. The parts 62 and 64 are connected rigidly to and in fixed relation to the platform 37. Various relations of the parts may be provided but in each instance the members 62 and 64 will be located at the leading end of the platform 37 adjacent to the pulleys 60 and remote from the winch. Figs. 7, 8 and 9 illustrate different interlock means.

In Fig. 7 the members 62 are shown located below and adjacent to the platform 37 at the leading edge thereof and inwardly spaced with respect to the overall outline of said plate so that the cross-bar 64 is inset and parallel relative to the leading edge of the platform 37. Any suitable bracing or supporting structure on the traverse unit, such as here designated by the numeral 66, may be employed in association with the members 62 and 64 to locate or position the same.

In Fig. 8 is illustrated a construction in which the members 62, which mount the bar 64, are supported by structure 66 and project outwardly beyond the outline of the plate 36, so that the member 64 is spaced outwardly from and parallel to the leading edge of the plate 37.

In Fig. 9 is illustrated a construction in which the members 62 are located at a level spaced below the plate 37 and directly connected to mounting structure 66 so as to position the bar 64 outwardly of the outline of the plate 37 and parallel to the leading edge thereof.

Each of the member or members, such as racks, molding machines, punch presses, work tables, or the like, to and from which the unit load may be transferred by the use of the transfer mechanism, will be provided with an interlock member mating with the interlock member carried by the device. In Fig. 7 the table, press or other support 70 is shown as being provided with a hook-shaped member having a plate portion 72 fixedly secured thereto, and hook plate 74 projecting perpendicularly to the plate 72 and notched at 76 at its upper edge, spaced from the plate 72 and adapted for interlocking engagement with the rod 64. Brace members 78 interconnect the parts 72 and 74 to rigidify the hook plate 74. It will be noted that in Fig. 7 the notch 76 is open at the top edge of the notch plate or hook member 74, and this arrangement is particularly well suited for use with the arrangement shown in Fig. 7 where the cooperating pin 64 is retracted and positioned close to the work plate 37.

In the use of the device the anchor means are engaged as a preliminary to the operation of transferring the die or other work piece 38 from one to the other of the platform 37 of the apparatus and the table top or machine bed 70. This arrangement is accommodated easily by virtue of the maneuverability of the fork lift truck, the vertical power actuated movement of the truck forks with the load thereon, and the lateral power actuated movement of the traverse unit relative to the base 30. Thus the device can be maneuvered to a position confronting but above the level of the bed or support 70, the traverse unit can then be projected to position bar 64 above hook notch 76, and forks 26 can then be lowered to cause the pin 64 upon the device to seat in the notch 76 of the hook plate 74 upon the fixed support 70. When the parts have been manipulated to this position, the platform 37 will be in the same plane as the bed 70, so that shifting of the die or work piece 38 from one of the two supporting surfaces 37 and 70 to the other, as by the use of the winch, is accommodated. The location of the interlock parts upon their respective mounting members can be carefully predetermined to effect the desired relationship of the parts when interlocked.

In the types of interlocks shown in Figs. 8 and 9, the notch 76' of the locking plate 74 opens at the bottom surface of the plate rather than at the top surface. The use of such an arrangement is possible where the interlocking bar 64 projects laterally beyond the outline of the platform or work support 36. In such constructions the transfer device must be carried at a lower level than member 70 as it approaches member 70, and is raised to effect the hooked connection of the parts required for transfer of the work piece 38 from one to the other of the members 37 and 70.

The arrangement of the parts shown in Fig. 1 entails shifting of the traverse unit transversely relative to fork arms 26 and the relation of the winch shaft 46 substantially parallel to the form arms 26, and this relation is preferred. This arrangement necessitates the location of the interlock means along the leading edge of the plate 37 opposite the winch and laterally spaced from the forks 26, as illustrated in Fig. 2. These conditions entail requirement for lateral discharge of the work and lateral loading of the work. Since a die or other work load may be heavy and the fork lift truck 20 is commonly narrow for maximum maneuverability and is counterbalanced only longitudinally and not laterally, it will be apparent that lateral shifting of the work or load 38 in transferring it between surfaces 37 and 70 imperils lateral stability of the device and the truck. Consequently, in the present construction, the interlocking relationship of the traverse unit of the load carrier upon the fork truck with the stationary support 70 minimizes or eliminates the problems of lateral stability. Thus it will be apparent that the load can easily be transferred between surfaces 37 and 70, as illustrated in dotted lines in Fig. 2, without occurrence of any instability in the process.

In operation, when it is desired to transfer the work or load member 38 from the platform 37 onto the fixed support 70, the intermediate portion of the cable 56 is trained around the pulleys 60 and thence around the member 38. Thereupon, operation of the winch to wind the cable upon the drum or drums 54 will shift the member 38 to the left as seen in Fig. 3 until all or a substantial part of the member 38 rests upon the support 70. The full movement of the member 38 to a desired location upon the fixed support 70 can be accomplished by moving the same progressively or step by step. For example, the member 38 may be moved from the full line to the dotted line position shown in Fig. 2, with the cable arranged as shown in full lines in Fig. 2. Thereupon, to move the work piece further to the left, the cable 56 may be released and a spacer may be interposed between the cable and the work piece, whereupon the further pulling upon the cable will move the work piece further to the left. For each successive step a larger spacer will be employed, until the full path of movement of member 38 to desired location on surface 70 has been traversed. As the member 38 is moved, the lateral relation and the vertical relation of the parts 37 and 70 is held constant by the interlock means and the weight of the load is progressively transferred without unbalancing the truck or the transfer device.

To withdraw a load 38 from a support 70 and load it upon the platform 37 of the device, the cable 56 is arranged as illustrated in dotted lines in Fig. 2, free of the rollers 60 and passing directly from drum or drums 54 around the load 38 so that winding of the cable upon the drums 54 pulls or shifts the load from the member 70 and onto the platform 37.

The type of interlock effected between the platform 37 and the stationary support 70 may vary through a wide range and it will be understood that the hook-type of interlock shown in Figs. 7 to 10 is illustrative and is not intended to be limiting.

Another type of such interlock is shown in Figs. 11 and 12, wherein the traverse unit of the device fixedly mounts a socket member 80 whose socket 82 is open at its outer end and extends in a direction parallel to the path of movement of the traverse unit 34. Stationary support 70 has a horizontal shaft or bar 84 projecting therefrom and adapted to fit freely and slidably within the socket 82. The shaft 84 has a reduced neck portion 86 spaced from its end adapted to be straddled by a bifurcated retainer plate 88 slidably receivable within a slot 89 in the socket member 80. In the use of this device the traverse member 34 is first adjusted by the fork arms of the fork lift truck to a level similar to the level of the member 70 and then is actuated by the power member 36 to slide socket member 80 onto the shaft 84 to a position to accommodate insertion of locking member 88 through the slot 89 to seat in the notch 86 of the shaft 84.

Punch presses and other machines requiring dies, molds and other units, commonly have inclined beds to accommodate automatic discharge of work pieces therefrom or to increase the vision of the operator. The mounting of a die or mold upon such machines, by presently available apparatus and means, is very difficult unless this machine has an adjustable bed which is shifted to a substantially horizontal position during the set-up period. I have found that it is possible to provide a device which will make possible the mounting of a die load or other work load upon an inclined support, and such a construction is here illustrated in Figs. 3 to 6, inclusive. In this construction the traverse unit includes a lower rigid structure or portion 90 carrying the rollers 92 which traverse the guide portions 94 of the frame or base 96 which carry the fork-engaging members 98. Power unit 100 shifts the traverse unit 90 relative to the base rails or track members 94. An upper structure 102 mounts a platform 104 at its upper surface and is pivoted at 106 on a transverse axis adjacent the leading end of the lower traverse structure 90. The leading edge portion of the upper structure 102 carries the interlock member 108 adapted for interlocking engagement with the interlock member 110 upon the stationary support 112.

One or more power-operated members 114, such as fluid pressure cylinder-piston units, are provided in the device with suitable connections or fluid lines which lead to pressure-generating means upon the fork lift truck or vehicle. Each of the power members 114 is preferably pivoted at 116 to the lower traverse unit portion 90 adjacent the leading end thereof. The piston stem 118 of the power member 114 is pivotally connected to one end of each of the levers 120 and 122 to interconnect said levers and constitute them a toggle. Lever 120 is connected at its opposite end with a bracket or other support 124 fixed to the lower traverse unit 90. The free end of the toggle member 122 is pivoted at 124 to the upper pivoted platform unit 102, 104. Suitable control means (not shown) are provided for controlling the operation of the power member 114 between a retracted position, as shown in Fig. 4, in which the upper platform 104 is substantially horizontal, and a position as shown in Fig. 6 in which the platform 104 has been tilted to an angle corresponding to the angle of the inclined work bed 112.

Any suitable winch 126 or load-advancing means is mounted upon platform 104 adjacent the free or vertically shifting end thereof and is provided with cable means 128 for engaging the unit load 130 to lower the load 130 from the platform 104 onto the inclined work bed 112 and to pull the work load 130 from inclined platform 112 onto platform 104. Pulleys 132 may be associated with this device to serve the same function as the pulleys 60 upon the device shown in Figure 2.

The load-shifting means of the device need not be winches. Thus many types of load shifters are now available upon the market and many of these may be used upon the present device. One such mechanism is shown in Fig. 13 somewhat schematically with reference to the load-supporting platform 37 of this device. This mechanism constitutes a pair of shafts extending transversely of the platform 37 at the leading and trailing end thereof and each mounting a sprocket 140 at its opposite ends. An electric motor or other prime mover, adapted to be powered from the source power upon the fork lift truck or any other source of power, and which is not shown herein, is associated with one of the sprocket shafts. Two chains 142 are trained around the sprockets 140, one at each side of the platform, for conjoint and equal movement upon rotation of the drive means. The upper run of each chain will preferably be at a level at or adjacent to the platform 37 and will extend parallel thereto. A cross-member 144 connects the upper runs of adjacent chains so that it sweeps lengthwise along the platform 137 upon operation or movement of the chains 142. Thus a load member 146 may be shifted from the platform 37 onto the fixed support 70 employing the member 144 as a pusher. After partial transfer of the load 146 from the platform 37 to the surface 70 occurs, as illustrated in dotted lines in Fig. 13, the pusher 144 may be retracted and a spacer 148 may be interposed between the same and the load member, whereupon further movement to the left, as seen in Fig. 13, will completely transfer or move the load 146 to desired position upon the support 70. For reverse operation, chains or cables may be employed passed around the load member 146 and anchored at the pusher bar 144 so that movement of that bar toward the right, as illustrated in Fig. 13, will pull the load 146 off of the platform 70 and onto the platform 37.

The load-supporting surface of the device may be of any type or character found suitable, and may be constructed to minimize frictional resistance to sliding movement of a unit load thereon incident to transfer of said load to and from a stationary support in any manner well understood in the mechanical arts. Thus the surface-forming structure may be fabricated to limit contact of the load to spaced bars (not shown) parallel to the direction of travel of the load, or may be provided with anti-friction rollers (not shown) on which the load bears as it rests upon or is shifted on the device.

While the preferred embodiments of the invention have been illustrated and described herein, it will be understood that changes in the construction may be made within the scope of the appended claims without departing from the spirit of the invention.

I claim:

1. A load transfer device comprising a vehicle, a vertically shiftable unit carried by said vehicle, a load-supporting traverse unit having a first part supported on said first unit and a second part shiftable in a predetermined path on said first part transversely on said first unit, and means carried by the leading end portion of the second part of said traverse unit for detachably interlocking said traverse unit to a fixed support.

2. A load transfer device comprising a vehicle, a vertically shiftable unit carried by said vehicle, guide means extending transversely on said unit, a load-engaging traverse unit shiftable transversely along the guide of said first unit, anchor means carried by the leading end portion of said traverse unit for detachable connection to a fixed support, and load-shifting means on said traverse unit.

3. A load transfer device comprising a vehicle, a vertically shiftable unit carried by said vehicle, a load-supporting traverse unit shiftable transversely on said first unit, cooperating means on said unit for guiding shifting of said traverse unit, said traverse unit including a tiltable upper load-supporting portion and interlock means carried by the leading end portion of the tiltable portion of said traverse unit and detachably engageable with a fixed support.

4. A load transfer device comprising a vehicle, a vertically shiftable unit carried by said vehicle and including a horizontal guide, a load-engaging traverse unit shiftable transversely relative to said vehicle on the guide of said first unit, and support-engaging means carried by the leading end portion of said traverse unit and adapted to be interlocked detachably to a fixed load support, each of said units being power actuated and said vehicle being self-propelled.

5. A load transfer device comprising a vehicle, a vertically shiftable unit carried by said vehicle, a load-supporting traverse unit shiftable transversely in a guided path on said first unit, power actuated means for acuating said traverse unit and anchor means carried by the leading end portion of said traverse unit for detachable connection with a fixed load-support, said vertically shiftable unit projecting longitudinally from said vehicle.

6. A load transfer device comprising a self-propelled counterbalanced truck having vertically shiftable forwardly projecting load-carrying forks, a base unit detachably mounted on said forks, a load-supporting traverse unit shiftable transversely on said base unit, means for shifting said traverse unit, and detachable interlock means for detachably connecting the leading end of said traverse unit to a fixed support.

7. A load transfer device comprising a self-propelled load carrier having a vertically shiftable substantially horizontally projecting load carrier, a base unit detachably mounted on said load carrier, a load-supporting traverse unit shiftable transversely on said base unit, means for shifting said traverse unit, detachable interlock means for detachably connecting the leading end of said traverse unit to a fixed support, and means on said traverse unit for shifting a unit load between said traverse unit and said support when connected by said interlock means.

8. A load transfer device comprising a self-propelled truck having vertically shiftable forwardly projecting load-carrying forks, a base unit detachably mounted on said forks, a load-supporting traverse unit shiftable transversely on said base unit, means for shifting said traverse unit, and support-engaging means carried by the leading margin of said traverse unit, said traverse unit including a horizontal base portion and a superstructure pivoted to said base portion adjacent to said support-engaging means.

9. A load transfer device adapted to be mounted on the vertically shiftable substantially horizontal fork arms of a fork lift truck, comprising a base, a load-carrying traverse unit, cooperating transverse substantially horizontal guide means and guide follower means associated with said base and traverse unit, means for bodily shifting said traverse unit on said base under control of said guide means, and means carried by the leading end portion of said traverse unit for detachable anchorage with a fixed support.

10. A load transfer device adapted to be mounted on the vertically shiftable substantially horizontal fork arms of a fork lift truck, comprising a base a traverse unit, cooperating transverse guide means and guide follower means associated with said base and traverse unit, means for shifting said traverse unit on said base under control of said guide means, means carried by the leading end portion of said traverse unit for detachable anchorage with a fixed support, and load-shifting means carried by said traverse unit.

11. A load transfer device adapted to be mounted on the vertically shiftable substantially horizontal fork arms of a fork lift truck, comprising a base, a traverse unit, cooperating transverse guide means and guide follower means associated with said base and traverse unit, means for shifting said traverse unit on said base under control of said guide means, and means carried by the leading end portion of said traverse unit for detachable anchorage with a fixed support, said traverse unit including a lower portion and an upper portion pivoted to said lower portion adjacent to said anchorage means.

12. A load transfer device adapted to be mounted on the vertically shiftable substantially horizontal fork arms of a fork lift truck, comprising a base, a load-carrying traverse unit, cooperating transverse substantially horizontal guide means and anti-friction guide traversing members associated with and controlling bodily movement of said traverse unit, and a connector carried by the leading end of said traverse unit for detachable connection with a support.

13. A load transfer device adapted to be mounted on the vertically shiftable substantially horizontal fork arms of a fork lift truck, comprising a base, a traverse unit, cooperating transverse guide means and guide follower means associated with said base and traverse means, means for shifting said traverse unit on said base under control of said guide means, means carried by the leading and portion of said traverse unit for detachable anchorage with a fixed support, and depending fork-engaging members carried by said base.

14. In combination, a self-propelled vehicle having pressure generating means and power actuated vertically shiftable load-engaging means a load transfer means detachably mounted on said load-carrying means and including a laterally bodily shiftable load-supporting part, pressure responsive means detachably connected to said pressure generating means and operable to actuate said laterally shiftable part, and a connector carried by the leading end part of said laterally shiftable part and detachably engageable with a support.

15. A load transfer device comprising a power driven load carrier for shifting a load from place to place, having a vertically shiftable mounting member, a base unit supported on said mounting member, a load-supporting traverse unit shiftable substantially horizontally on said base unit, means for shifting said traverse unit on said base unit, detachable interlock means for detachably connecting the leading end of said traverse unit to a fixed support, and means on said traverse unit for shifting a unit load between said traverse unit and said support when connected by said interlock means.

References Cited in the file of this patent
UNITED STATES PATENTS

| | | |
|---|---|---|
| 476,547 | Morse | June 7, 1892 |
| 1,317,776 | Claus | Oct. 7, 1919 |
| 1,781,955 | Porter | Nov. 18, 1930 |
| 1,786,884 | Allan | Dec. 30, 1930 |
| 2,120,042 | Remde | June 7, 1938 |
| 2,150,371 | Furnish | Mar. 14, 1939 |
| 2,266,791 | Norbom | Dec. 23, 1941 |
| 2,575,552 | Glenn | Nov. 20, 1951 |
| 2,585,095 | Daniels | Feb. 12, 1952 |
| 2,613,827 | Van Doorne | Oct. 14, 1952 |
| 2,633,809 | Robinson et al. | Apr. 7, 1953 |
| 2,691,449 | Claybourn | Oct. 12, 1954 |
| 2,699,878 | Avery | Jan. 18, 1955 |
| 2,733,822 | Woodard | Feb. 7, 1956 |
| 2,752,056 | Lull | June 26, 1956 |
| 2,756,885 | Ackermann | July 31, 1956 |

FOREIGN PATENTS

| | | |
|---|---|---|
| 292,957 | Italy | Feb. 5, 1932 |